R. C. KIRBY.
BOLT AND NUT LOCK.
APPLICATION FILED JUNE 23, 1911.
1,023,430.
Patented Apr. 16, 1912.
Fig. 1.
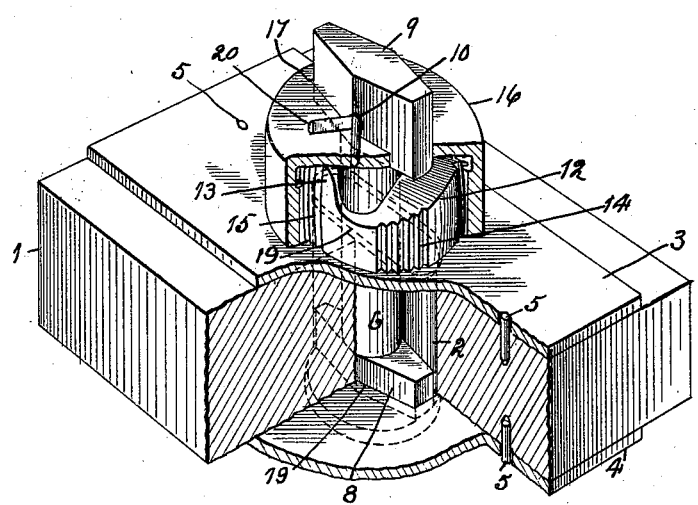
Fig. 3.
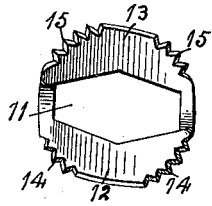
Fig. 4.
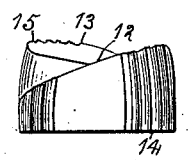
Fig. 2.
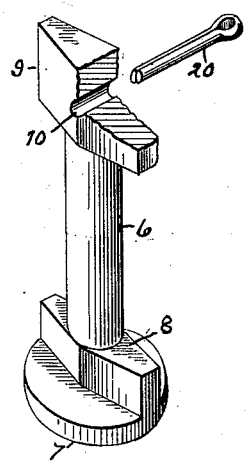
Fig. 5.
Witnesses:
W. L. Dow
E. Behel.
Inventor:
Robert C. Kirby
By A. O. Behel
Atty.

UNITED STATES PATENT OFFICE.

ROBERT C. KIRBY, OF ROCKFORD, ILLINOIS, ASSIGNOR TO ADAM I. WOOD, OF ROCKFORD, ILLINOIS.

BOLT AND NUT LOCK.

1,023,430.  Specification of Letters Patent.  Patented Apr. 16, 1912.

Application filed June 23, 1911. Serial No. 634,899.

*To all whom it may concern:*

Be it known that I, ROBERT C. KIRBY, a citizen of the United States, residing at Rockford, in the county of Winnebago and State of Illinois, have invented certain new and useful Improvements in Bolt and Nut Locks, of which the following is a specification.

The object of this invention is to construct a lock for a bolt to prevent its axial relation and in connection therewith, a lock for a nut which will prevent the lengthwise movement of the bolt.

In the accompanying drawings, Figure 1 is a perspective view of my improvements, partly in section. Fig. 2 is a perspective view of the bolt, partly in section, and a perspective view of the cotter pin. Fig. 3 is a plan view of the nut. Fig. 4 is an edge elevation of the nut. Fig. 5 is an inner face view of the cap.

My improvements are intended for use in connection with railway construction in which fish plates overlap the ends of abutting rails and are held in connection therewith by bolts.

The plate 1 is intended to represent the web of vertical section of a railway rail to which I have applied my improvements and which is provided with an opening 2. The plates 3 and 4 represent the fish plates and are each formed with an opening 19 corresponding with the opening 2. Should my improvements be used to unite work other than fish plates to rails, the plates may be held against displacement by the pins 5.

The bolt comprises the shank 6, head 7 having a transverse projection 8, and the other end of the shank has a transverse projection 9 provided with a transverse hole 10. A nut has a central opening 11 corresponding with the opening 2. This nut has two cam faces 12 and 13, the exterior faces of which are formed with serrations 14 and 15 respectively. A locking cap 16 has a central opening 17 corresponding with the opening 2, and the internal face of this cap is formed with serrations 18.

In use, the bolt is passed through the openings in the fish plates, and the opening 2 in the rail. The projection 8 being located in the opening 19, the bolt will be held against rotation, and the head 7 resting against the plate will prevent longitudinal movement of the bolt. The nut is placed over the end 9 of the bolt, and its cam faces 12 and 13 will engage the under face of the projection, and by turning the nut axially of the bolt, the head of the bolt will be drawn up against the plate 4. The cap 16 is placed over the projection 9 of the bolt and the serrations thereof fitting the serrations of the two cam faces of the nut. A cotter pin 20 is placed in the opening 10 in the projection 9 of the bolt, and outside of the cap 16 as shown at Fig. 1. The cotter pin prevents the displacement of the cap, the cap prevents movement of the nut, and the nut holds the bolt against lengthwise movement.

I claim as my invention—

1. A lock comprising a bolt having a head at one end, and a cross projection at its other end, a nut provided with a central opening, and a cam face having edge serrations, a cap provided with a central opening fitted to the cross-projection of the bolt and having its inner face formed with serrations to engage the serrations of the nut, and a pin passing through the cross-projection to prevent the lengthwise movement of the cap.

2. A lock comprising a bolt having a head and projection at one end, and a cross-projection at its other end, a nut provided with a central opening and a cam face having edge serrations, a cap provided with a central opening fitted to the cross-projection of the bolt and having its inner face formed with serrations to engage the serrations of the nut, and a pin passing through the cross-projection to prevent the lengthwise movement of the cap.

In testimony whereof I have hereunto set my hand in presence of two subscribing witnesses.

ROBERT C. KIRBY.

Witnesses:
  A. O. BEHEL,
  M. E. BAKER.

Copies of this patent may be obtained for five cents each, by addressing the "Commissioner of Patents. Washington, D. C."